United States Patent [19]

Wisler et al.

[11] Patent Number: 5,517,865

[45] Date of Patent: May 21, 1996

[54] VORTEX SUPPRESSION FOR AN EDUCTOR

[75] Inventors: David C. Wisler, Fairfield; Hyoun-Woo Shin, Cincinnati, both of Ohio

[73] Assignee: General Electric Company, Cincinnati, Ohio

[21] Appl. No.: 714,807

[22] Filed: Jun. 13, 1991

[51] Int. Cl.[6] .................................................. G01N 1/20
[52] U.S. Cl. .................................. 73/863.43; 73/863.41; 181/215; 181/220
[58] Field of Search ............................ 73/866.5, 863.41, 73/863.43; 181/215, 220

[56] References Cited

U.S. PATENT DOCUMENTS

| | | | |
|---|---|---|---|
| 3,613,827 | 10/1971 | Labussiere | 181/215 |
| 3,910,375 | 10/1975 | Hache et al. | 181/215 |
| 4,298,089 | 11/1981 | Birch et al. | 181/220 |
| 4,436,481 | 3/1984 | Linder | 415/119 |
| 4,439,104 | 3/1984 | Edmonds | 415/161 |
| 4,531,356 | 7/1985 | Linder | 60/39.02 |
| 4,644,806 | 2/1987 | Flagg et al. | 73/863.58 |

OTHER PUBLICATIONS

"A Study of Vortex Cancellation", by Allan Schaffer Journal Of The Aero Space Sciences, vol. 27, Mar., 1960, No. 3, Published by Institute Of The Aeronautical Sciences, Inc.

*Primary Examiner*—Hezron E. Williams
*Assistant Examiner*—Rose M. Finley
*Attorney, Agent, or Firm*—Andrew C. Hess; Patrick P. Scanlon

[57] ABSTRACT

A vortex suppressing flow eductor apparatus having a vortex filament producing flow eductor is provided with corresponding vortex destroying plates positioned and extending sufficiently downstream from a point within educted flow and deep enough into the vortex filament so as to essentially destroy the vortex filament. A particular embodiment provides a freestream sensor scoop, for use in an aircraft gas turbine engine inlet, having an eductor diffusing channel and a fairing surrounding a forward portion of the diffusing channel. A sensor supporting mast is provided for helping to measure freestream air characteristics. Vortex destroying plates are provided for suppressing vortex filaments generated by the channel, fairing, and mast.

15 Claims, 3 Drawing Sheets

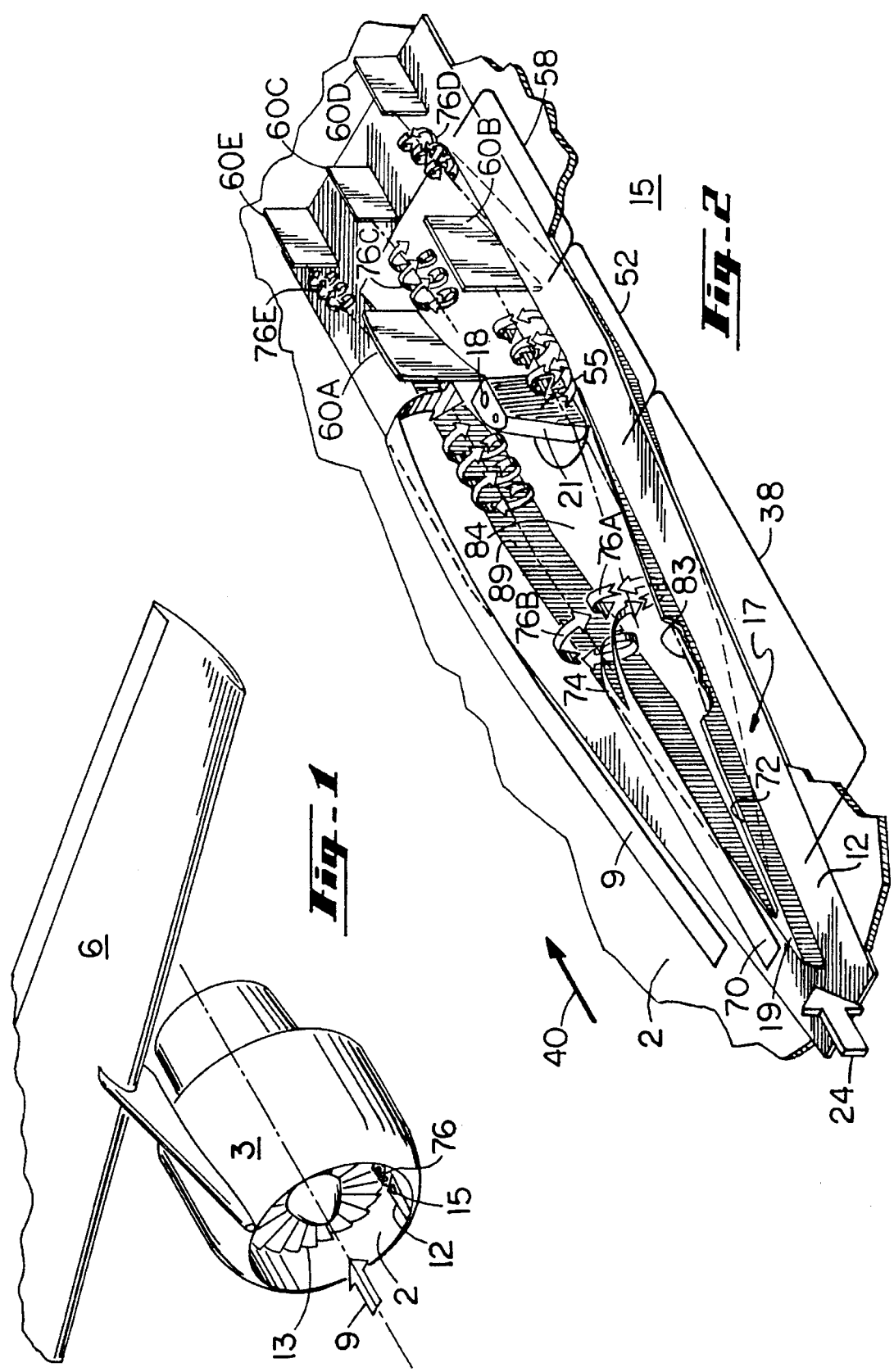

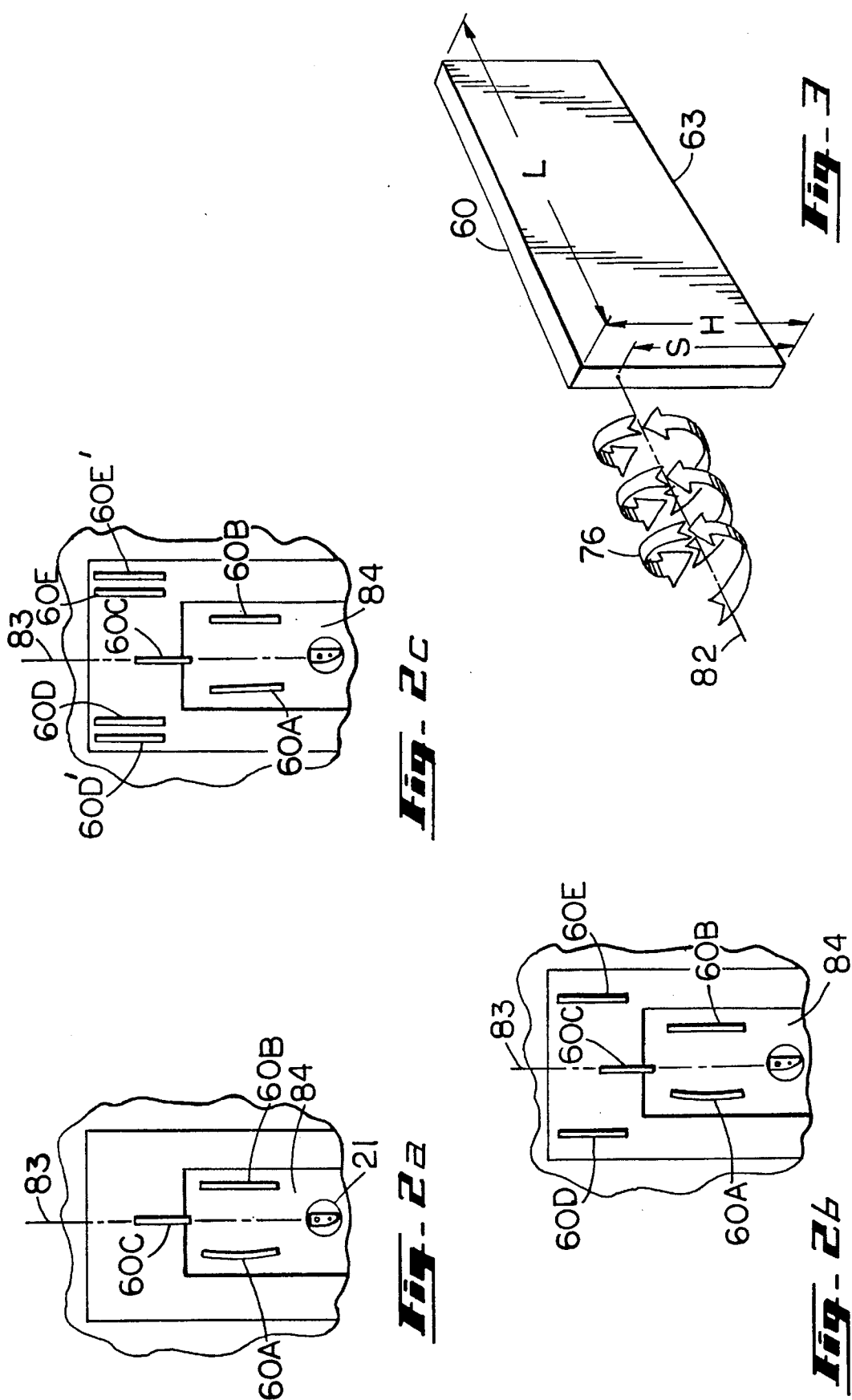

VORTEX SUPPRESSION FOR AN EDUCTOR

BACKGROUND OF THE INVENTION

1. Field of the Invention

This invention relates to vortex structure suppression and related noise reduction due to vortices generated by eductors particularly as applied to aircraft gas turbine engine sensor scoops and mounts.

2. Description of Related Art

The present invention relates to eductors in the form of scoops surrounding sensor assemblies used for sampling a flowstream and particularly an airstream flowing adjacent to a boundary layer in an aircraft in order to measure airstream characteristics such as temperature and pressure. Although the invention was designed for use in nacelle inlets of gas turbine engines it is not limited in scope to such applications as will be seen further herein.

Typically in the past, measurement of the airstream's characteristics, such as temperature, pressure, and velocity, was provided by the use of various types of probes. Such probes are typically mounted within a mast that extended from the inner surface of an aircraft gas turbine engine nacelle into the airstream in order to position the sensing element of the probe outside the airstream's boundary layer. Boundary layers have vastly different characteristics than incoming airstreams (often referred to as freestream air) and so one must carefully try to avoid measuring boundary layer characteristics instead of freestream air characteristics.

Foreign object damage (often referred to as FOD) was another problem encountered by these type of sensors. Sensors and the probes are particularly susceptible to damage caused by being struck by incoming objects such as birds, insects, ice particles, and miscellaneous types of debris. Rain water also poses a problem because, though it may not causes physical damage to the probe, rain does tend to alter measurements taken by temperature probes.

For these reasons an airstream eductor for use as a sensor scoop was developed as described in U.S. Pat. No 4,644,806, entitled "Airstream Eductor" by Elgin E. Flagg and Melvin Bobo, which issued Feb. 24, 1987 and assigned to General Electric, the same assignee as in the present invention, and incorporated herein by reference. The Flagg invention provides a diffusing channel recessed into the inner surface of the nacelle for diverting boundary layer air from a probe and inducing freestream air to impinge upon the probe.

However, vortices are generated that coalesce into vortex filaments that, besides enhancing the eductors operation, travel downstream into the gas turbine engine's fan causing loud and undesirable noise to be generated. The present invention is directed at reducing fan velocity distortion and this noise.

SUMMARY OF THE INVENTION

The present invention provides a vortex suppressor for use with a vortex generating eductor that is particularly useful as part of a freestream sampling means. The preferred embodiment of the present invention provides at least one vortex suppressing plate for each vortex generated, wherein the plates are located aft of the sensor, essentially normal to the circular direction of the vortex flow, and sufficiently higher than the vortex centerline and long enough to suppress or even destroy the vortex and produce essentially linear flow.

One particular embodiment of the present invention provides an eductor having a vortex producing diffusing channel in the wall of an inlet portion of an aircraft gas turbine engine nacelle and the freestream sampling means includes a sensor mounted on a mast that is disposed so as to measure freestream air characteristics and to avoid measuring boundary layer characteristics. A more particular embodiment provides an airfoil shaped mast having an asymmetric airfoil section that produces slightly unsymmetrical vortices and at least one curved vortex destroying plate that is curved so as to be essentially normal to the local vortex flow. An alternative to the curved plate is a slightly slanted plate while another embodiment provides more than one plate for at least one of the generated vortices.

ADVANTAGES

Among the advantages provided by the present invention is the ability to destroy vortices generated in a flow. Another advantage of the present invention is its ability to destroy noise producing vortices and suppress the noise generated by the vortices. Yet another advantage of the present invention is to destroy noise producing vortices and suppress the noise generated by the vortices over a wide range of operating conditions.

The present invention provides a more uniform velocity distribution to reduce flow distortion and noise when using a vortex filament generating freestream air sensor assembly. This provides a quieter means to sample freestream flow than was previously available allowing relatively quiet freestream air measurements particularly for use in the inlet of aircraft gas turbine engines.

BRIEF DESCRIPTION OF THE DRAWING

The foregoing aspects and other features of the invention are explained in the following description, taken in connection with the accompanying drawing where:

FIG. 1 is a perspective view illustrating a probe sensor apparatus disposed in an aircraft engine nacelle in accordance with one embodiment of the present invention.

FIG. 2 is a perspective view illustrating one form of the preferred embodiment of the present invention.

FIG. 2a is a top view of an alternate arrangement of vortex destroying plates shown in FIG. 2.

FIG. 2b is a top view of a second alternate arrangement of vortex destroying plates shown in FIG. 2.

FIG. 2c is a top view of the preferred embodiment of the present invention shown in FIG. 2.

FIG. 3 is a perspective view illustrating a vortex destroying plate in accordance with the preferred embodiment of the present invention.

DETAILED DESCRIPTION OF THE INVENTION

Figure 3A:
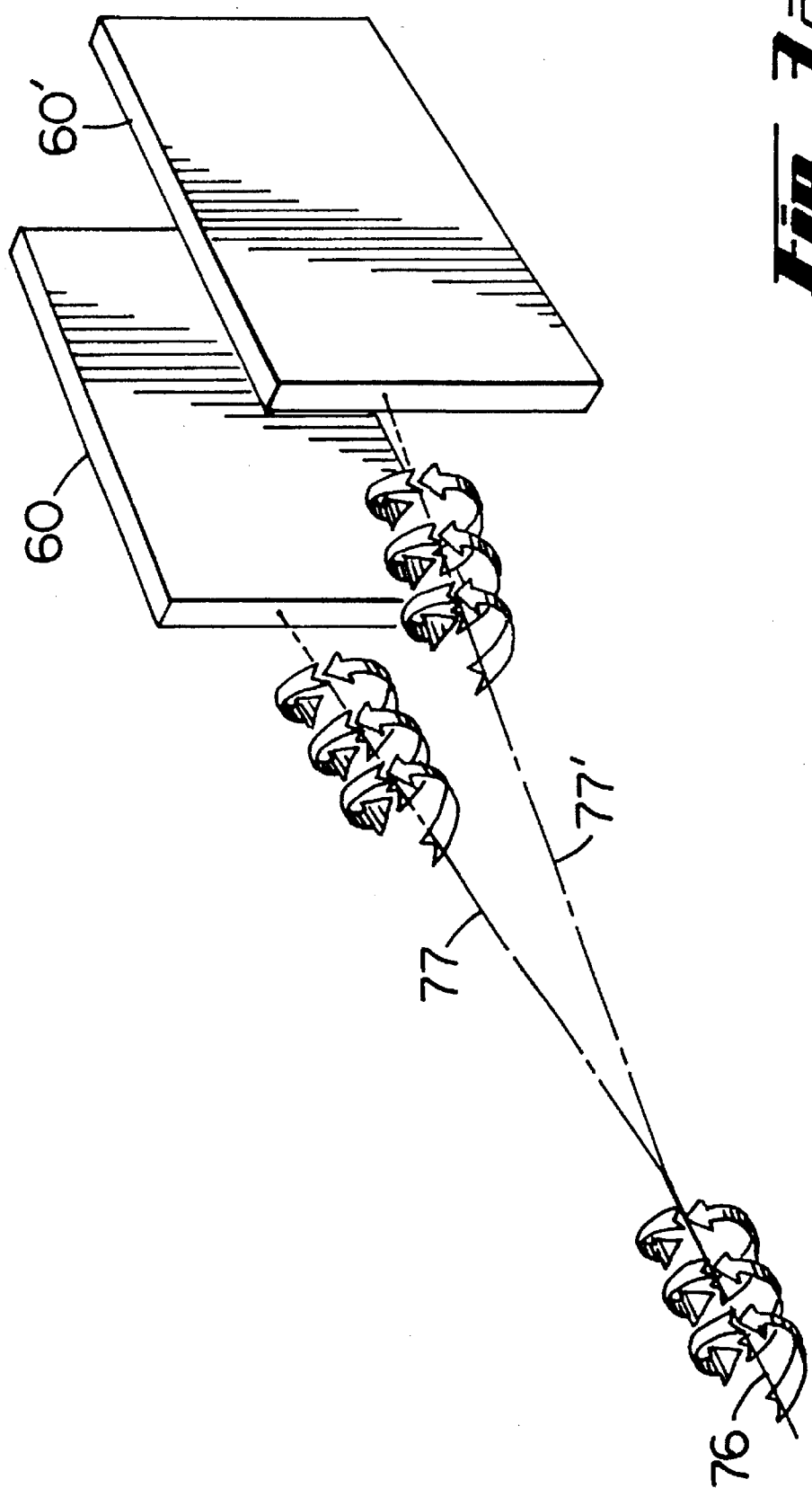
FIG. 3a is a perspective view illustrating a double vortex destroying plate arrangement in accordance with an alternate embodiment of the present invention.

Illustrated in FIG. 1, is a nacelle 3 which conventionally houses a gas turbine engine (not shown) and which is suspended from an aircraft wing 6. A freestream air sensing probe apparatus 15 is disposed on the surface of inlet 2 of nacelle 3 to measure characteristics of freestream air 9. Freestream air sensing probe apparatus 15, shown in greater detail in FIG. 2, includes a mast 21 that supports and positions a sensing element 18 outside the boundary layer 24 in order to reduce the effects of the boundary layer 24 upon measurements taken of freestream air 9 of FIG. 1.

FIG. 2 illustrates one form of the preferred embodiment of the present invention, sensor probe apparatus 15 having an airstream eductor 17 essentially recessed into the surface of nacelle inlet 2 and includes a fairing 19 that gradually blends into an eductor base 12 that is essentially flush with the surface of inlet 2 and serves to reduce impact damage caused by foreign object ingestion such as runway debris or ice. Sensor probe apparatus 15 includes a three sided diffusing receiver channel 38 which is generally pyramidal in shape. Receiver channel 38 has a cross-section that increases in the downstream direction indicated by arrow 40. In the preferred embodiment, fairing 19 generally extends the length of receiver channel 38.

Sensor probe apparatus 15 further includes a sampling channel 52, downstream of receiver channel 38, having a substantially constant cross-sectional area in the downstream direction 40. A sampling probe 55 is positioned in the sampling channel 52 and the probe typically contains a pressure sensor and a temperature sensor (not specifically shown) mounted in mast 21. Downstream of sampling channel 52 is an ejector channel 58 which decreases in cross-sectional area in the downstream direction.

Incoming airstream 70 encounters relatively stationary boundary layer air at the edges 72 of the diffusing receiver channel 38 in FIG. 2. Because the incoming airstream 70 has a finite, non-zero viscosity, the incoming airstream 70 turns into the receiver channel 38 as shown by curved arrows 74. As the airstreams 74 progress downstream, they evolve into vortex filaments 76A and B. This vortex formation is assisted by the diffusing characteristics of the receiver channel 38, which cause a reduction in air in the downstream direction 40.

Vortex filaments 76A and B straddle the centerline 83 of the diffusing receiver channel 38 and rotate in opposite directions to each other. Further, the directions are such that airflow is toward the channel floor 84 near the centerline. The process of eduction is more particularly described in the Flagg patent referenced above. The vortex filament 76 shown in FIG. 1 is for illustrative purposes only and depicts the problem of how a vortex filament generated by prior art air sampling apparatus continue on in a generally straight line into the engine's fan 13.

Referring again to FIG. 2, the preferred embodiment of the invention includes a mast 21 having a non-symmetric airfoil cross-section with respect to centerline 83 that generates a vortex filament 76C having a slightly angle with respect to centerline 83. Typically, the sensing element 18 of the probe 15 is supported by a mast 21 in order to position the sensing element 18 outside the boundary layer 24 in order to reduce the effects of the boundary layer 24 upon the measurement taken. Other vortex filaments such as 76D and 76E may be generated points where fairing 19 ends which is the end of diffusing channel 38.

Referring again to FIG. 2, vortex destroying plates 60A–60E are positioned downstream of the vortex filament producing structures or elements. In the case of the eductor freestream flow sampling device illustrated in FIG. 2, five vortex filaments 76A–76E are shed from the eductor channel wall 89 and mast 21 and flow downstream in a generally straight line. Slight variations in symmetry and straightness of the lines is usually due to an asymmetry in the inlet flow, such as swirl or by an asymmetry in the a structure such as asymmetric mast 21. It is important to know where vortex filaments are located for correctly and effectively positioning plates 60a–60e.

Several methods are conventionally known for determining the location of vortex filaments generated by structures such as the eductor and masts of the present invention. The use of wind tunnels, models, full scale test apparatus are all acceptable means of modelling the flow that produces the vortex filaments. Location indicators that have been used include loose strings, tufts, and hot wire anemometers. It has been found that loose strings used in conjunction with a full scale test model provides adequate results. It has also been found that sometimes vortex filaments jump slightly sideways to the direction of the local flow causing a single filament to require two closely spaced plates to effectively suppress a single vortex filament.

FIG. 3 illustrates positioning of exemplary vortex destroying plates 60a–60e in FIG. 2. A vortex destroying plate 60 should have a height H that extends from its base 63 sufficiently past a distance S at which a vortex centerline 82 of vortex filament 76 intercepts plate 60 and a length L so as to essentially destroy the vortex filament. Testing as described above is the preferred mode of placing and sizing plates 60 but other means such as the use of computational fluid dynamics analysis to solve the related equations may also be adequate.

FIG. 2b is a top view of the preferred embodiment shown in FIG. 2. illustrating the preferred arrangement of 5 vortex destroying plates 60A–60E corresponding to vortex filaments 76A–76E in FIG. 2. A first alternative arrangement is illustrated in FIG. 2c providing secondary plates 60D' and 60E' that may be used to further suppress vortex filaments that tend to oscillate or jump transversely to the flow when it encounters a vortex destroying plate as further illustrated in FIG. 3a. FIG. 3a illustrates an example of a double plate arrangement and an oscillating vortex filament 76 having two extreme transverse positions illustrated as 77 and 77'.

FIG. 2a is a top view of a second alternate embodiment of the present invention illustrating an arrangement requiring the use of only three vortex destroying plates 60A–60C corresponding to vortex filaments 76A–76C in FIG. 2. Such an alternative arrangement may be preferred in designs for which only two significant vortex filaments such as 76A and 76B of FIG. 2, are generated.

While various embodiments of the present invention have been described fully in order to explain the principles of the present invention, it is understood that various modifications or alterations may be made to these embodiments without departing from the scope of the invention as set forth in the appended claims.

We claim:

1. A vortex suppressing apparatus for use downstream of a vortex filament producing section of a flow eductor, said vortex suppression apparatus comprising:

at least one vortex filament destroying plate having a length extending downstream from a position aft of an end of the vortex filament producing section and having a predetermined height greater than that of a centerline of a vortex filament produced by the vortex filament producing section and said height extends deep enough into said vortex filament so as to essentially destroy said vortex filament.

2. A vortex suppression apparatus for use downstream of a vortex filament producing section of a flow eductor which includes a diffusing channel operable to produce at least one set of counter-rotating vortex filaments, said vortex suppression apparatus comprising:

at least one set of vortex filament destroying plates having a length extending downstream from a position aft of an end of the vortex filament producing section of the flow eductor and having a predetermined height greater than that of a centerline of the vortex filaments and said height extends deep enough into the vortex filaments so as to essentially destroy the vortex filaments.

3. A vortex suppressing flow eductor apparatus comprising:

a vortex filament producing flow eductor and at least one vortex filament destroying plate having a length extending a predetermined distance downstream from a position aft of an end of said flow eductor and having a predetermined height greater than that of a centerline of a vortex filament produced by said flow eductor and extending into said vortex filament so as to essentially destroy said vortex filament.

4. A vortex suppressing flow eductor apparatus as claimed in claim 3 further comprising:

multiple vortex filament producing elements and respective ones of said vortex destroying plate.

5. A vortex suppressing flow eductor apparatus as claimed in claim 4 wherein said flow eductor is operable to produce counter-rotating vortex filaments.

6. A vortex suppressing flow eductor apparatus as claimed in claim 3 wherein said flow eductor includes a vortex producing channel.

7. A vortex suppressing flow eductor apparatus as claimed in claim 6 wherein said flow eductor further includes a fairing surrounding a forward portion of said vortex producing channel.

8. A freestream sensing apparatus, for measuring freestream air characteristics, said freestream sensing apparatus comprising:

a vortex filament producing channel having a vortex filament producing freestream sampling means including a sensor and mounted at a position in said channel, at least one vortex filament destroying plate extending from a point downstream of said position, and said plate having a length and a height, wherein said length extends downstream from said position, and said height is greater than that of a predetermined centerline of a vortex filament generated by said freestream sampling means and extends deep into a vortex filament produced by said freestream sampling means so as to essentially destroy the vortex filament generated by said freestream sampling means.

9. A freestream sensing apparatus as claimed in claim 8 wherein said freestream sampling means comprises a mast having an asymmetric airfoil shape.

10. A freestream sensing apparatus as claimed in claim 8 wherein said freestream sampling means comprises a mast having an asymmetric airfoil shape and said plate is asymmetrically biased with respect to a predetermined freestream direction.

11. A freestream sensing apparatus as claimed in claim 10 wherein said plate is curved with respect to said freestream direction.

12. A freestream sensing apparatus as claimed in claim 10 wherein said plate is angled with respect to said freestream direction.

13. A freestream sensing apparatus as claimed in claim 10 further comprising:

a forward flow diffusing portion of said channel, a plurality of channel generated vortex filament destroying channel plates, wherein each of said channel plates has, a length extending downstream from a position aft of an end of a respective channel vortex filament producing element, and a predetermined height greater than that of a centerline of the channel generated vortex filament and said height extends deep enough into the channel generated vortex filament so as to essentially destroy the channel generated vortex filament.

14. A freestream sensing apparatus as claimed in claim 13 further comprising a fairing surrounding a forward portion of said channel.

15. A vortex suppressing apparatus for use downstream of a section of a flow eductor operable to produce at least one oscillating vortex filament, said vortex suppression apparatus comprising:

at least one set of oscillating vortex filament destroying plates spaced relatively apart and having lengths extending downstream from a position aft of an end of the section and heights greater than that of a centerline of the oscillating vortex filament and said height extends deep enough into the oscillating vortex filament produced by the eductor so as to essentially destroy the oscillating vortex filament generated by the eductor.

\* \* \* \* \*